(12) United States Patent
Sullivan et al.

(10) Patent No.: US 7,376,523 B2
(45) Date of Patent: *May 20, 2008

(54) CONTACT SENSITIVE DEVICE

(75) Inventors: Darius Martin Sullivan, Huntingdon (GB); Nicholas Patrick Roland Hill, Huntingdon (GB)

(73) Assignee: New Transducers Limited, Huntingdon, Cambridgeshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 11/614,328

(22) Filed: Dec. 21, 2006

(65) Prior Publication Data

US 2007/0118305 A1 May 24, 2007

Related U.S. Application Data

(63) Continuation of application No. 11/085,658, filed on Mar. 21, 2005, now Pat. No. 7,184,898, which is a continuation of application No. 10/729,540, filed on Dec. 5, 2003, now Pat. No. 6,871,149.

(60) Provisional application No. 60/432,024, filed on Dec. 10, 2002.

(30) Foreign Application Priority Data

Dec. 6, 2002 (GB) .................................. 0228512.0

(51) Int. Cl.
*G06F 19/00* (2006.01)
*G01C 19/00* (2006.01)

(52) U.S. Cl. ....................................... 702/56; 702/150

(58) Field of Classification Search ................. 702/54, 702/56, 94, 95, 150; 345/173–177, 179
See application file for complete search history.

(56) References Cited

U.S. PATENT DOCUMENTS 4,246,439 A 1/1981 Romein
4,389,711 A 6/1983 Hotta et al.

(Continued)

FOREIGN PATENT DOCUMENTS

DE 4143364 9/1993

(Continued)

OTHER PUBLICATIONS

Bendat et al., Engineering Applications of Correlation and Spectral Analysis, Chapter 6 entitled "Propagation Path Identification" and Chapter 7 entitled "Single Input/Multiple Output Problems," a Wiley-Interscience Publication, 1980, pp. 121-167.

(Continued)

*Primary Examiner*—Michael Nghiem
(74) *Attorney, Agent, or Firm*—Zagorin O'Brien Graham LLP

(57) ABSTRACT

A contact sensitive device includes a member capable of supporting bending waves and a plurality of sensors mounted on the member for measuring bending wave vibration in the member. The sensors measure the bending wave signals and by calculating a phase angle for each measured bending wave signal and a phase difference between the phase angles of at least two pairs of sensors so that at least two phase differences are calculated, the location of the contact can be determined.

14 Claims, 11 Drawing Sheets

U.S. PATENT DOCUMENTS

| | | | |
|---|---|---|---|
| 4,393,268 A | 7/1983 | Guedj et al. | |
| 5,161,126 A | 11/1992 | Marcus | |
| 5,162,618 A | 11/1992 | Knowles | |
| 5,262,777 A | 11/1993 | Low et al. | |
| 5,305,239 A | 4/1994 | Kinra | |
| 5,329,070 A | 7/1994 | Knowles | |
| 5,412,189 A | 5/1995 | Cragun | |
| 5,541,372 A | 7/1996 | Baller et al. | |
| 5,591,945 A | 1/1997 | Kent | |
| 5,628,031 A | 5/1997 | Kikinis et al. | |
| 5,637,839 A | 6/1997 | Yamaguchi et al. | |
| 5,638,093 A | 6/1997 | Takahashi et al. | |
| 5,691,959 A | 11/1997 | Kriewall et al. | |
| 5,717,432 A | 2/1998 | Miwa et al. | |
| 5,717,434 A | 2/1998 | Toda | |
| 5,831,934 A | 11/1998 | Gill et al. | |
| 5,838,088 A | 11/1998 | Toda | |
| 5,856,820 A | 1/1999 | Weigers et al. | |
| 5,877,458 A | 3/1999 | Flowers | |
| 5,892,652 A | 4/1999 | Bony et al. | |
| 5,986,224 A | 11/1999 | Kent | |
| 6,005,327 A * | 12/1999 | Toda | 310/313 R |
| 6,049,328 A | 4/2000 | Vanderheiden | |
| 6,060,812 A * | 5/2000 | Toda | 310/313 R |
| 6,072,475 A | 6/2000 | van Ketwich | |
| 6,091,406 A | 7/2000 | Kambara et al. | |
| 6,157,373 A | 12/2000 | Rego | |
| 6,160,757 A | 12/2000 | Täger et al. | |
| 6,246,638 B1 | 6/2001 | Zook et al. | |
| 6,335,725 B1 | 1/2002 | Koh et al. | |
| 6,343,162 B1 | 1/2002 | Saito et al. | |
| 6,366,277 B1 | 4/2002 | Armstrong | |
| 6,384,743 B1 | 5/2002 | Vanderheiden | |
| 6,400,996 B1 | 6/2002 | Hoffberg et al. | |
| 6,414,673 B1 | 7/2002 | Wood et al. | |
| 6,535,147 B1 | 3/2003 | Masters et al. | |
| 6,580,799 B1 | 6/2003 | Azima et al. | |
| 6,871,149 B2 | 3/2005 | Sullivan et al. | |
| 6,891,527 B1 | 5/2005 | Chapman et al. | |
| 6,922,642 B2 | 7/2005 | Sullivan et al. | |
| 7,157,649 B2 * | 1/2007 | Hill | 178/18.04 |
| 7,184,898 B2 * | 2/2007 | Sullivan et al. | 702/56 |
| 2001/0006006 A1 | 7/2001 | Hill | |
| 2001/0026625 A1 | 10/2001 | Azima et al. | |
| 2002/0125065 A1 | 9/2002 | Bank et al. | |
| 2002/0135570 A1 | 9/2002 | Iisaka et al. | |
| 2003/0066692 A1 | 4/2003 | Devige et al. | |
| 2003/0217873 A1 | 11/2003 | Paradiso et al. | |
| 2004/0160421 A1 | 8/2004 | Sullivan | |
| 2005/0146511 A1 | 7/2005 | HIll et al. | |
| 2005/0146512 A1 | 7/2005 | Hill et al. | |
| 2005/0146513 A1 | 7/2005 | Hill et al. | |
| 2005/0174338 A1 | 8/2005 | Ing et al. | |
| 2005/0212777 A1 | 9/2005 | Ing et al. | |
| 2005/0226455 A1 | 10/2005 | Aubauer et al. | |
| 2006/0070854 A1 | 4/2006 | Boelaars | |
| 2006/0132464 A1 | 6/2006 | Sullivan | |

FOREIGN PATENT DOCUMENTS

| | | |
|---|---|---|
| EP | 0 296 569 A2 | 12/1988 |
| EP | 0 526 879 A1 | 2/1993 |
| EP | 0 597 228 A2 | 5/1994 |
| EP | 0 656 603 A1 | 6/1995 |
| FR | 2 787 608 | 6/2000 |
| GB | 2 301 217 A | 11/1996 |
| JP | 08-297534 | 11/1996 |
| JP | 2002311626 | 10/2002 |
| TW | 465104 B | 11/2001 |
| WO | WO 84/00427 | 2/1984 |
| WO | WO 94/02911 | 2/1994 |
| WO | WO 96/11378 | 4/1996 |
| WO | WO 97/09842 | 3/1997 |
| WO | WO 97/09847 | 3/1997 |
| WO | WO 99/65274 | 12/1999 |
| WO | WO0030025 | 5/2000 |
| WO | WO 00/38104 | 6/2000 |
| WO | WO 01/43063 A1 | 6/2001 |
| WO | WO 01/48684 A2 | 7/2001 |
| WO | WO 02/01490 A1 | 1/2002 |
| WO | WO 03/005292 A1 | 1/2003 |
| WO | WO 03/067511 A2 | 8/2003 |

OTHER PUBLICATIONS

Brink, M. C., "The Acoustic Representation of Bending Waves", Laboratory of Acoustic Imaging and Sound Control, Delft University of Technology, Nov. 2002, pp. i-69.

Ishii Hiroshi, et al., "PingPongPlus: Design of an Athletic-Tangible Interface for Computer-Supported Cooperative Play", Published in the Proceedings of CHI'99, May 15-20, 1999, pp. 1-8.

Kim, Young Jin, et al., "Acoustic Generation in Liquid Crystals", Sep. 27, 1999, vol. 75, No. 13, pp. 1985-1987.

Paradiso, J. A., et al., "Passive Acoustic Knock Tracking for Interactive Windows", ACM CHI 2002 Conference, Minneapolis, Minnesota, Apr. 20-25, 2002, (2 pages).

Search Report for ROC (Taiwan) Patent Application No. 092134393 (Translation), Jun. 1, 2007, 1 page.

* cited by examiner

CONTACT SENSITIVE DEVICE

CROSS-REFERENCE TO RELATED APPLICATION(S)

This application is a continuation of application Ser. No. 11/085,658, filed Mar. 21, 2005, now U.S. Pat. No. 7,184,898, entitled "Contact Sensitive Device," naming Darius Martin Sullivan and Nicholas Patrick Roland Hill as inventors; which is a continuation of application Ser. No. 10/729,540, filed Dec. 5, 2003, now U.S. Pat. No. 6,871,149, entitled "Contact Sensitive Device," naming Darius Martin Sullivan and Nicholas Patrick Roland Hill as inventors; which application claimed the benefit under 35 U.S.C. § 119(e) of application Ser. No. 60/432,024, filed Dec. 10, 2002, all of which applications are incorporated herein by reference.

BACKGROUND

1. Field of the Invention

The invention relates to contact sensitive devices.

2. Description of the Related Art

Visual displays often include some form of touch sensitive screen. This is becoming more common with the emergence of the next generation of portable multimedia devices such as palm top computers. The most established technology using waves to detect contact is Surface Acoustic Wave (SAW), which generates high frequency waves on the surface of a glass screen, and their attenuation by the contact of a finger is used to detect the touch location. This technique is "time-of-flight," where the time for the disturbance to reach one or more sensors is used to detect the location. Such an approach is possible when the medium behaves in a non-dispersive manner, i.e., the velocity of the waves does not vary significantly over the frequency range of interest.

SUMMARY

According to one embodiment of the invention, there is provided a contact sensitive device comprising a member capable of supporting bending waves, and a plurality of sensors (e.g., three or more) mounted on the member for measuring bending wave vibration in the member, whereby each sensor determines a measured bending wave signal. A processor calculates a location of a contact on the member from the measured bending wave signals, in that the processor calculates a phase angle for each measured bending wave signal, then calculates a phase difference between the phase angles of at least two pairs of sensors from which the location of the contact is determined.

According to another embodiment of the invention, there is provided a method of determining information relating to a contact on a contact sensitive device that includes providing a member capable of supporting bending waves and a plurality of sensors (e.g., three or more) mounted on the member for measuring bending wave vibration in the member, applying a contact to the member at a location, using each sensor to determine a measured bending wave signal and calculating the location of a contact from the measured bending wave signal by calculating a phase angle for each measured bending wave signal, calculating a phase difference between the phase angles of at least two pairs of sensors and determining the location of the contact from the at least two calculated phase differences.

The following features may be applied to both the device and the method with the processor being adapted to provide many of the calculations or processing steps of the method.

Reflected waves may be suppressed by placing an absorber in contact with the edges of the member. The mechanical impedance of the absorber and member may be selected so as to significantly reduce or minimize reflections of bending waves from the edges of the member. In particular, the impedances may be selected such that bending wave energy is strongly absorbed in a frequency band around a chosen frequency $\omega_0$. The impedance of the absorber may be selected to be both resistive and compliant. The impedances may be selected to satisfy the following equation:

$$Z_T = -iZ_B(\omega_0),$$

where $Z_T$ is the termination impedance of the absorber, $Z_B$ is the mechanical impedance of the edge of the member, and i is the imaginary number=$\sqrt{-1}$.

The absorber may be made from foamed plastics which may have open or closed cells and may be polyurethane or polyvinylchloride. For example, the foam may be a soft PVC predominantly closed cell foam such as MIERS™ or a medium to high density, open cell polyurethane foam. The absorber may extend substantially around the periphery of the member. The absorber may act as a mounting which supports the member in a frame or to another surface.

The member may comprise a raised pattern on its surface whereby a contact drawn across the surface provides a variable force to the member to generate bending waves in the member. The pattern may be periodic, or quasi-periodic with a statistically well-defined spatial distribution of undulations. The pattern may be random whereby a contact traveling over the surface of the member generates a random bending wave signal. The random relief pattern may be an anti-reflective coating, an anti-glare surface finish, or an etched finish such as those which are found on many known transparent panels placed in front of electronic displays.

The member may be a liquid crystal display screen comprising liquid crystals utilized to excite or sense bending wave vibration in the member.

Each measured bending wave signal may be processed by a band-pass filter with a pass-band centered at the chosen frequency $\omega_0$ and having a bandwidth of $\Delta\omega$. The bandwidth $\Delta\omega$ of the filter is preferably chosen to address the Doppler effect whereby a bending wave arrives at a point with a different frequency from its original frequency. Accordingly, the bandwidth preferably obeys the relationship:

$$\Delta\omega >> 2k(\omega_0)v_{max},$$

where $v_{max}$ is the maximum lateral velocity of the contact across the surface, e.g., if the contact is provided by a stylus, $v_{max}$ is the maximum velocity that a user is capable of moving the stylus.

The phase of each filtered signal may be measured by comparison with a reference signal. The reference signal may have a frequency $\omega_0$. The measured phase is the average phase difference between the input and reference signals, optimally measured over the interval $2\pi/\Delta\omega$. Alternatively, the reference signal may be derived from a filtered signal from a second sensor, in which case the measured phase is the phase difference between two input signals.

The phase differences may be calculated at intervals of $2\pi/\Delta\omega$ which may be intervals of less than 10 ms. The reference and input signals may be fed to a phase detector. Output from the phase detectors may be fed through low-pass filters having frequency cut-offs of approximately $\Delta\omega/2$, then through digitizers and finally through a processor to calculate the phase angle $\theta$.

The instantaneous phases, $\theta_l(t)$ and $\theta_m(t)$, of two measured bending wave signals may satisfy the phase difference equation:

$$\Delta\theta_{lm} = \theta_l - \theta_m = k(\omega_0)\Delta x_{lm} + 2\pi n_{lm},$$

where $\Delta x_{lm} = x_l - x_m$ ($x_m$ and $x_l$ being the distance from the contact location to each sensor labeled m and l respectively), and $k(\omega)$ is the wavevector. This equation may be satisfied if the path-length difference between two sensors is less than the coherence length of the bandpass filter, which is defined as $$x_c = \frac{2\pi\omega_0}{\Delta\omega k(\omega_0)}.$$

The coherence condition is therefore $|\Delta x_{lm}| \ll x_c$. If the coherence condition is not satisfied, the above phase equation may not be satisfied.

Thus, values of $n_{lm}$ and the phase angle difference are required to determine the location of the contact. The shape of the member may be selected to constrain the magnitude of $\Delta x_{lm}$ to values less than half of one wavelength, i.e., $|\Delta x_{lm}| < \pi/k(\omega_0)$. In this case, where all possible values of $\Delta x_{lm}$ satisfy the condition $|\Delta x_{lm}| < \pi/k(\omega_0)$, there is only one value of $n_{lm}$ which is the integer $n_{lm}$ satisfying $|\Delta\theta_{lm} - 2\pi n_{lm}| < \pi$. Alternatively, n may be estimated or inferred in some way.

Another class of foams that has been found to be suitable are acrylic closed cell foams. These may have a high degree of damping and relatively high stiffness. Such properties are particularly suited to edge termination of stiff, heavy materials such as glass. Examples include 3M serial numbers 4956, 4910, 4950, and 4655.

Each phase angle difference in combination with the range of possible values of the integer $n_{lm}$ may be used to generate a series of path-length differences thereby defining a series of discrete hyperbolic curves on the surface of the member, denoting possible locations of the contact. The location of the contact may be determined by plotting each hyperbola defined by each path-length difference and selecting a point at which a large number of the hyperbolae intersect or nearly intersect. This point is likely to be the true location of the contact.

Where $n_{lm}$ is unknown, the minimum number of series of hyperbolae required to determine the contact location is three and the likelihood of determining the correct location of the contact is increased by increasing the number of hyperbolae to be plotted. Multiple sensors may be used whereby a phase angle difference may be calculated for each pair of sensors, thus generating multiple hyperbolae. In this embodiment, the minimum number of sensors is three.

Alternatively, where $n_{lm}$ is unknown, the measured bending wave signal from each sensor may be divided into two or more discrete frequency bands whereby a phase angle difference may be calculated for each frequency band and for each pair of sensors. Although multiple phase angle differences may be calculated from a single pair of sensors, the phase angle differences at different frequencies are derived from the same path-length difference. Thus, the minimum number of sensors is three. The dividing of the frequency bands may be achieved by processing the bending wave signals by at least two band-pass filters having different pass-band frequencies. For example, using two band-pass filters having frequencies $\omega_0 + \omega_\delta$ and $\omega_0 - \omega_\delta$, the phase angle differences $\Delta\theta_a$, $\Delta\theta_b$ from two sensors may be defined as $$\Delta\theta_a = k(\omega_0 + \omega_\delta)\Delta x + 2\pi n_a$$

$$\Delta\theta_b = k(\omega_0 - \omega_\delta)\Delta x + 2\pi n_b$$

where $\Delta x$ is a single path-length difference defined by the contact and the position of the sensors.

Therefore the values of $n_a$ and $n_b$ may be selected so that the measured phase angle differences infer similar values of the path-length difference. There may be only one combination of values $(n_a, n_b)$ for which this is possible. In this case the true value of the path-length difference may be determined. The correct combination $(n_a, n_b)$ may be determined as the combination of values that minimize the expression:

$$\left| \frac{\Delta\theta_a - 2\pi n_a}{k(\omega_0 + \omega_\delta)} - \frac{\Delta\theta_b - 2\pi n_b}{k(\omega_0 - \omega_\delta)} \right|$$

The path-length difference may then be estimated as:

$$\Delta x = \frac{1}{2}\left( \frac{\Delta\theta_a - 2\pi n_a}{k(\omega_0 + \omega_\delta)} + \frac{\Delta\theta_b - 2\pi n_b}{k(\omega_0 - \omega_\delta)} \right).$$

Where this process is repeated with two pairs of sensors, two path-length differences may be determined, which in turn may be used to determine the location of the contact.

Alternatively, where $n_{lm}$ is unknown, an initial determination of the location of the contact may be made using the methods taught in WO01/48684 and PCT/GB2002/003073 (as summarized in FIG. 11). Thereafter, if the condition $\Delta\omega \gg 2k(\omega_{0,max})$ holds, the phase angle differences change by small increments over the timescale $\Delta t = 2\pi/\omega$. Accordingly, each value of n may be chosen to minimize the change in path-length difference.

Measured phase angle differences may contain random errors which may result in the selection of incorrect values of n. This error may be alleviated by evaluating the likelihood of successive sequences of n, for example, by a state-space estimator such as the well known Kalman filter. The sequence having the maximum measure of likelihood is selected.

The state-space estimator provides an estimate of the internal state of a system of which noisy measurements are made. A necessary input to the state-space estimator is a statistical description of the evolution of the system state. An example of such a state is the set of coordinates that describes the position and velocity of an object in contact with the member. It is widely known that the Kalman filter and other state-space estimators may provide a measure of likelihood that a sequence of observed, noisy measurements are consistent with the model of the system state.

A state-space estimator may therefore be employed to take a sequence of a pair of path-length differences (say $\Delta x_{12}$ and $\Delta x_{34}$) taken at different times (say $t_1, t_2, t_3, \ldots$ ), to estimate the system-state, i.e., the position and velocity of the contact, at those times. Moreover, the overall likelihood of those values of path-length difference being consistent with the model of the system may be evaluated.

Where the sequence of path-length differences are obtained from a sequence of phase-angle differences and a set of integers ($n=n(t_1), n(t_2), n(t_3), \ldots$), the measure of likelihood generated by the state-space estimator may be used to infer the likelihood that the correct values of n were chosen. It follows that a method for choosing the correct sequence of integers, n, is to find the sequence for which the state-space estimator gives the maximum measure of likelihood.

As mentioned above, the state-space estimator uses some statistical description of the evolution of the system state. A suitable model for the motion of the contact may be a simple random walk. Alternatively, the model may employ a detailed statistical description of how the user moves the stylus or finger. One example is a statistical description of how the user moves a pen while writing text or individual characters.

The processor may further be adapted to include in the determination procedure any available information about where the contact can be expected. For example, if the member is an input device for a graphical user interface where the user is presented with a choice of 'buttons' to press, it may be useful to assume that any contact on the member occurs within the discrete areas corresponding to the buttons.

Alternatively, a map of the probability at which a contact is likely to occur and which is based on the expected behavior of the user may be used. The device may comprise a software application with a graphical user interface (GUI) which interacts with the operating system by means of an application program interface (API) in which the API is adapted to generate the probability map. The probability map may be based on the location, size, and frequency of use of objects presented by the graphical user interface. The probability map may also be based on information about the relative likelihood of the various GUI elements being activated.

The following characteristics may apply to all embodiments of the invention. The device may comprise means for recording measured bending wave signals from the or each sensor over time as the contact moves across the member. The information relating to the contact may be calculated in a central processor. The sensors may be mounted at or spaced from an edge of the member. The sensors may be in the form of sensing transducers which may convert bending wave vibration into an analog input signal.

The member may be in the form of a plate or panel. The member may be transparent or alternatively non-transparent, for example, having a printed pattern. The member may have uniform thickness. Alternatively, the member may have a more complex shape, for example, a curved surface and/or variable thickness.

The device may be a purely passive sensor with the bending wave vibration and, hence, the measured bending wave signals being generated by an initial impact or by frictional movement of the contact. The contact may be in the form of a touch from a finger or from a stylus which may be in the form of a hand-held pen. The movement of a stylus on the member may generate a continuous signal which is affected by the location, pressure and speed of the stylus on the member. The stylus may have a flexible tip, e.g., of rubber, which generates bending waves in the member by applying a variable force thereto. The variable force may be provided by a tip which alternatively adheres to or slips across a surface of the member. As the tip moves across the member, a tensile force may be created which at a certain threshold causes any adhesion between the tip and the member to break, thus allowing the tip to slip across the surface. The bending waves may have frequency components in the ultrasonic region (>20 kHz).

The member may also be an acoustic radiator, and an emitting transducer may be mounted to the member to excite bending wave vibration in the member to generate an acoustic output. The frequency band of the audio signal of the transducer preferably differs from and does not overlap the frequency band of the measurements from the sensors. The audio signal may thus be filtered, for example, the audio band may be limited to frequencies below 20 kHz, and the vibration measurements may be limited to frequencies above 20 kHz. A sensor may have dual functionality and act as the emitting transducer.

The or each emitting transducer or sensor may be a bender transducer which is bonded directly to the member, for example, a piezoelectric transducer. Alternatively, the or each emitting transducer or sensor may be an inertial transducer which is coupled to the member at a single point. The inertial transducer may be either electrodynamic or piezoelectric.

A contact sensitive device according to the invention may be included in a mobile phone, a laptop or a personal data assistant. For example, the keypad conventionally fitted to a mobile phone may be replaced by a continuous molding which is touch sensitive according to the present invention. In a laptop, the touchpad which functions as a mouse controller may be replaced by a continuous molding which is a contact sensitive device according to the invention. Alternatively, the contact sensitive device may be a display screen, e.g., a liquid crystal display screen comprising liquid crystals which may be used to excite or sense bending waves. The display screen may present information relating to the contact.

BRIEF DESCRIPTION OF THE DRAWINGS

The present invention may be better understood, and its numerous objects, features, and advantages made apparent to those skilled in the art by referencing the accompanying drawings.

FIG. 7b is a schematic block diagram of apparatus used with that of FIG. 7a.

FIG. 12b is a method of separating audio signal and measured bending wave signal in the device of FIG. 12a.

The use of the same reference symbols in different drawings indicates similar or identical items.

DESCRIPTION OF THE PREFERRED EMBODIMENT(S)

Figure 1:
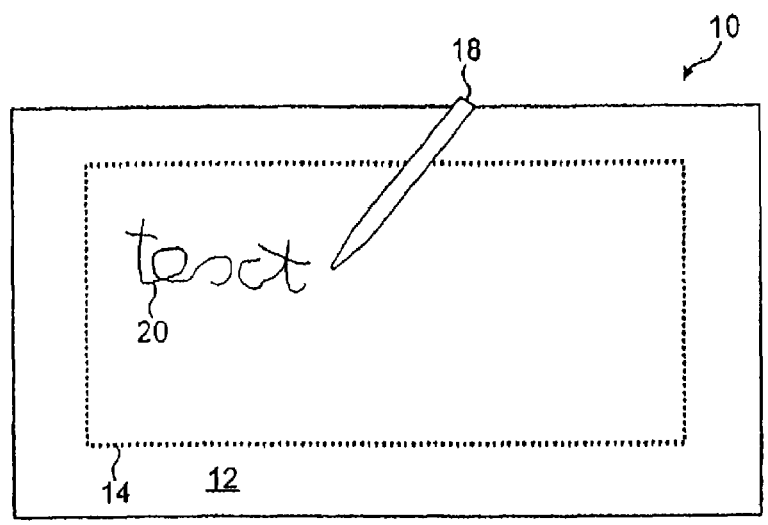
FIG. 1 is a schematic plan view of a touch sensitive device according to one embodiment of the invention.

FIG. 1 shows a contact sensitive device 10 comprising a transparent touch sensitive plate 12 mounted in front of a display device 14. The display device 14 may be in the form of a television, a computer screen or other visual display device. A stylus 18 in the form of a pen is used for writing text 20 or other matter on the touch sensitive plate 12.

Figure 2:
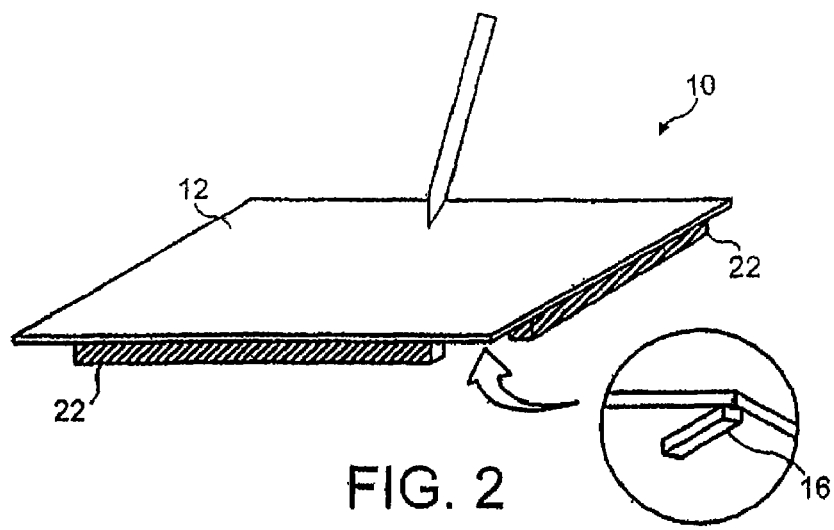
FIG. 2 is a schematic perspective view of the device of FIG. 1.

The transparent touch sensitive plate 12 is a member, e.g., an acoustic device, capable of supporting bending wave vibration. As shown in FIG. 2, four sensors 16 for measuring bending wave vibration in the plate 12 are mounted on the underside thereof. The sensors 16 are in the form of piezoelectric vibration sensors and are mounted one at each corner of the plate 12. At least one of the sensors 16 may also act as an emitting transducer for exciting bending wave vibration in the plate. In this way, the device may act as a combined loudspeaker and contact sensitive device.

In the following applications, U.S. patent application Ser. No. 09/746,405, filed Dec. 26, 2000, now U.S. Pat. No. 7,157,649, entitled "Contact Sensitive Device" naming Nicholas P. R. Hill as an inventor; International Publication Number WO 01/48684 (International Application Number PCT/GB00/04851); and International Application PCT/GB2002/003073, filed Jul. 3, 2002, which applications are incorporated herein by reference, contact sensitive devices and methods of using the same are described. The applications describe a device that includes a member capable of supporting bending wave vibration and a sensor mounted on the member for measuring bending wave vibration in the member and for transmitting a signal to a processor whereby information relating to a contact made on a surface of the member is calculated from the change in bending wave vibration in the member created by the contact.

By bending wave vibration it is meant an excitation, for example, by the contact, which imparts some out-of-plane displacement to the member. Many materials bend, some with pure bending with a perfect square root dispersion relation and some with a mixture of pure and shear bending. The dispersion relation describes the dependence of the in-plane velocity of the waves on the frequency of the waves.

Bending waves provide advantages, such as increased robustness and reduced sensitivity to surface scratches, etc. However, bending waves are dispersive, i.e., the bending wave velocity, and hence the "time of flight," is dependent on frequency. In general, an impulse contains a broad range of component frequencies and, thus, if the impulse travels a short distance, high frequency components will arrive first. In U.S. patent application Ser. No. 09/746,405, International Publication Number WO 01/48684 and International Application PCT/GB2002/003073, a correction to convert the measured bending wave signal to a propagation signal from a non-dispersive wave source may be applied so that techniques used in the fields of radar and sonar may be applied to detect the location of the contact.

A mounting 22 made of foamed plastics is attached to the underside of, and extends substantially around, the periphery of the plate 12. The mounting 22 has adhesive surfaces whereby the member may be securely attached to any surface. The mechanical impedance of the mounting and plate are selected so as to minimize reflections of bending waves from the plate edges.

Figure 3:
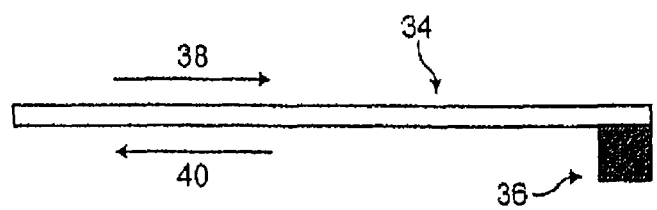
FIG. 3 is a schematic side view of a one-dimensional beam.

The relationship between mechanical impedance of the mounting and the plate may be approximated by considering the one-dimensional model shown in FIG. 3. The model comprises a waveguide 34 in the form of a beam which terminates at an edge mounting 36 having a termination impedance. An incident wave 38 traveling down the waveguide 34 is reflected by the mounting 36 to form a reflected wave 40. The incident and reflected waves are plane waves traveling in the direction perpendicular to the edge. Assuming the mounting 36 satisfies the following boundary conditions:

(i) the termination impedance only couples into the lateral velocity, i.e., it does not provide any torque resistance; whereby the bending moment is equal to zero at the edge; and (ii) the ratio of the lateral shear force and the velocity at the edge is equal to the terminal impedance;

the reflection coefficient at the mounting is given by:

$$R(\omega) = \frac{-Z_T/Z_B(\omega) - i}{Z_T/Z_B(\omega) + 1}$$

where $Z_T$ is the termination impedance of the mounting and $Z_B$ is the mechanical impedance of the end of the waveguide, given by $$Z_B(\omega) = \frac{Bk^3(\omega)}{2\omega}(1+i),$$

where $k(\omega)$, is the wavevector which may be expressed in terms of the bending stiffness, B, and mass per unit area, $\mu$, of the panel, $$k = \left(\frac{\mu}{B}\right)^{1/4}\sqrt{\omega}.$$

Thus, the reflection coefficient is determined by the ratio of the impedances at the end of the waveguide and the mounting. Furthermore, the impedance of the waveguide is proportional to the square root of frequency and is both real and reactive in equal weights (i.e., $\pi/4$ phase angle). Accordingly, the reflection coefficient is likely to be strongly frequency dependent.

The reflection coefficient vanishes, i.e., bending wave energy is strongly absorbed in a frequency band around $\omega_0$, if the following condition is satisfied:

$$Z_T = -iZ_B(\omega_0).$$

Thus, the termination impedance of the mounting must have both real and imaginary components, or, equivalently, the mounting should be both resistive and compliant.

The plate may be, for example, 1 mm thick polycarbonate sheet which has mass per unit area, $\mu = 1.196$ kg m$^{-2}$ and bending stiffness, B=0.38 N m. The equations above can be used to calculate the impedances of the plate and absorber required to strongly absorb bending wave energy around the chosen angular frequency $\omega_0=2\pi(900$ Hz).

The impedance, per unit width for a 1 mm beam approximation of the plate is $$Z_B(\omega_0)=(1+i)33.8 \text{ N s m}^{-2}.$$

The properties of the absorber which provide the desired absorption are thus:

Resistance per unit width, $\text{Re}(Z_T)=\text{Im}[Z_B(\omega_0)]=33.8$ N s m$^{-2}$.

Stiffness per unit width, $-i\text{Im}(Z^T)\omega_0=\text{Re}[Z_B(\omega_0)]$ $\omega_0=1.91\times10^5$ N m$^{-2}$.

Figure 4A:
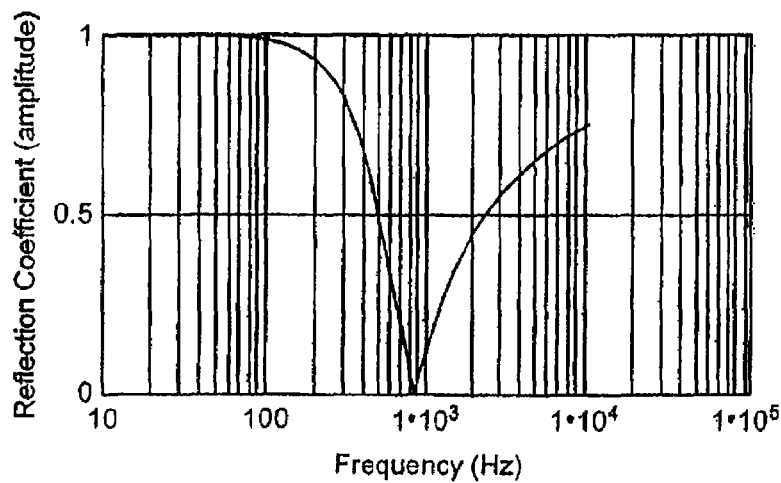
FIG. 4a is a graph showing the amplitude of the reflection coefficient against frequency (Hz), the amplitude is unitless since it is a ratio.
Figure 4B:
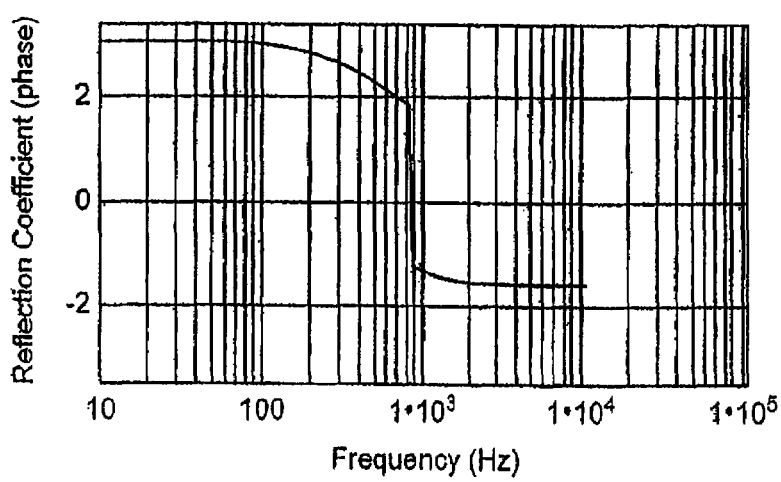
FIG. 4b is a graph showing the phase (in radians) of the reflection coefficient against frequency (Hz).

The reflection coefficient is a unitless complex number. FIGS. 4a and 4b are graphs showing the amplitude and phase of the reflection coefficient $R(\omega)$ varying with frequency. The amplitude of the reflection coefficient is zero and its phase is reversed for $\omega_0$ approximately equal to 900 Hz.

Figure 5A:
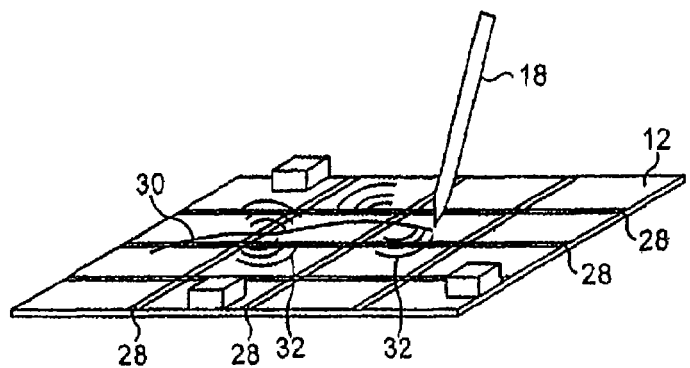
FIGS. 5a and 5b are schematic perspective views of alternative touch sensitive devices.
Figure 5B:
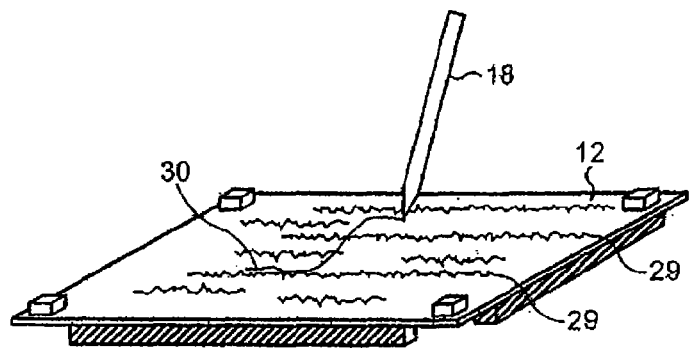

In FIGS. 5a and 5b, the plate 12 has uniform surface roughness in the form of a raised surface pattern 28,29. The stylus 18 is drawn across the surface along a path 30 and as it crosses a raised part or line of the pattern, it generates bending waves 32 in the member. Thus, contact from the stylus 18 provides a source of bending wave vibration in the member. In FIG. 5a, the surface pattern 28 is a periodic pattern of raised crossed lines and in FIG. 5b, the surface pattern 29 is a random relief pattern.

In the embodiments of FIGS. 2, 5a and 5b, as the contact moves over the rough surface of the member, bending waves radiate isotropically in the member from the point of contact. The displacement of the member at a distance, x, from the point of contact is related to the displacement at the point of contact by a transfer function, $H(\omega; x)$. At distances larger than the wavelength, $\lambda=2\pi/k(\omega)$, the transfer function can be approximated as, $$H(\omega; x) = \frac{A}{\sqrt{k(\omega)\,x}} e^{ik(\omega)x},$$

where A is a constant and $k(\omega)$, is the wavevector defined previously. Although $H(\omega; x)$ strictly only applies to bending waves on an infinite plate, since the mounting strongly absorbs bending wave vibrations, the relationship is satisfied. The transfer function shows that where a source of bending waves emits a purely sinusoidal frequency with angular frequency, $\omega_0$, the phase difference $\Delta\theta_{12}$ between displacements at two locations which are at distances, $x_1$, and $x_2$, from the point of contact for the source is:

$$\exp(i\Delta\theta_{12})=\exp[ik(\omega_0)(x_1-x_2)].$$

This implies the following relationship between the phase angle difference, the path-length difference $\Delta x=(x_1-x_2)$ and an integer $n_{12}$:

$$\Delta\theta_{12}=\theta_1-\theta_2=k(\omega_0)\Delta x_{12}+2\pi n_{12}.$$

Figure 6:
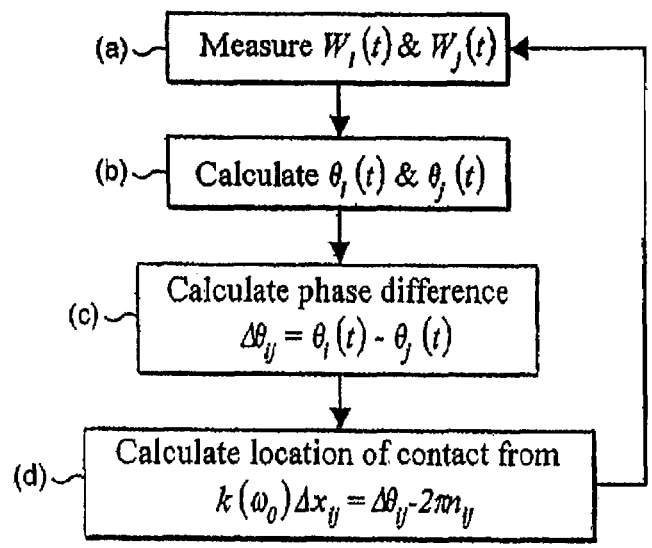
FIG. 6 is a flowchart of a method of finding the location of a contact according to an embodiment of the invention.

FIG. 6 shows the steps in the method for using this equation to determine the contact location:
(a) Measure a bending wave signal with each sensor to give measured bending wave signals $W_i(t)$ and $W_j(t)$,
(b) Calculate the phase angles $\theta_i(t)$ and $\theta_j(t)$ of the measured bending wave signals $W_i(t)$ and $W_j(t)$,
(c) Calculate the difference between the two phase angles $\theta_i(t)$ and $\theta_j(t)$,
(d) Calculate the location of the contact from $$k(\omega_0)\Delta x_{ij}=\Delta\theta_{ij}-2\pi n_{ij}$$

Figure 7A:
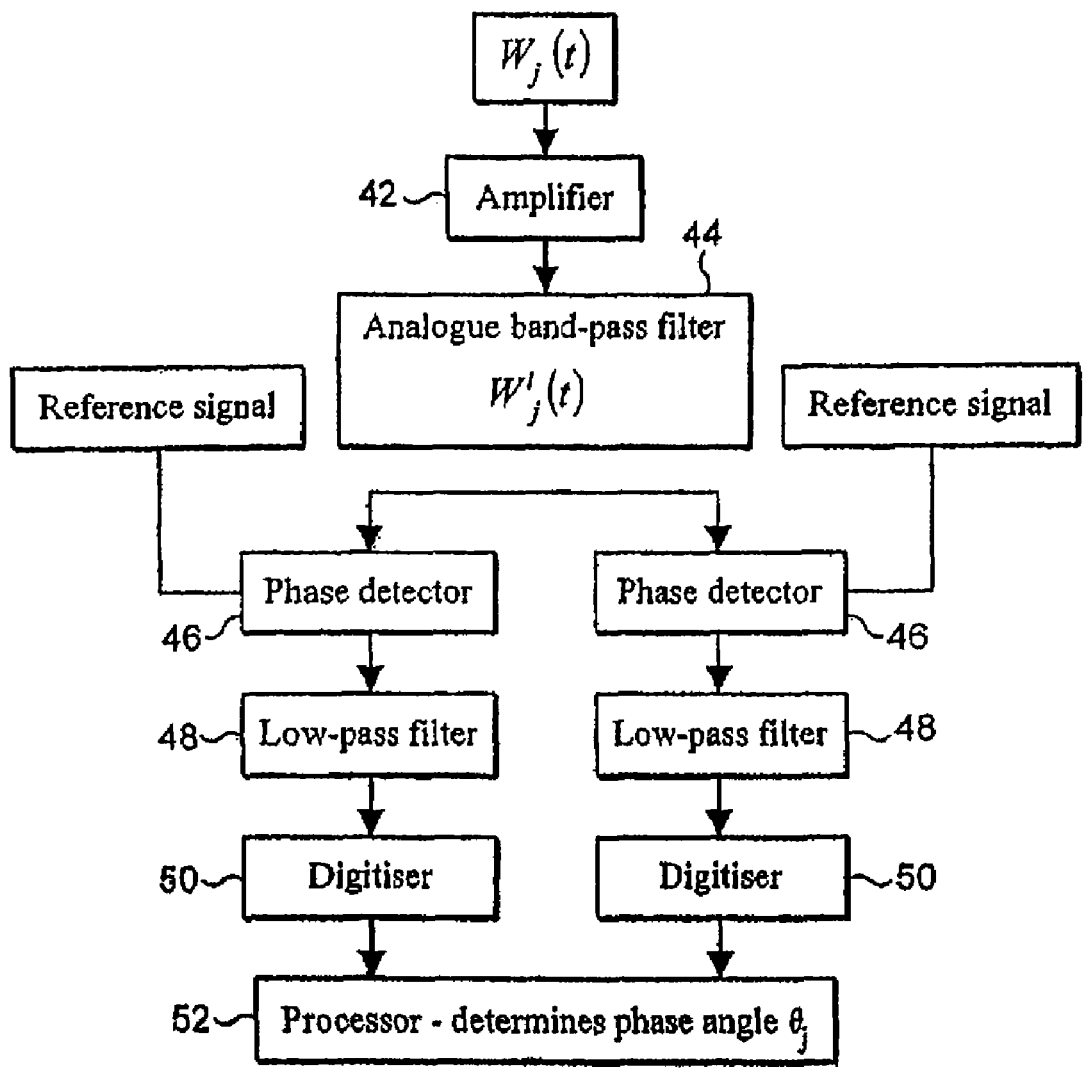
FIG. 7a is a schematic block diagram of apparatus used for calculating phase angles.

FIG. 7a shows a schematic block diagram of a device for calculating the phase angle $\theta_j$ of a bending wave signal $W_j(t)$ measured by one of the sensors. The signal $W_j(t)$ is a random signal and is thus uncorrelated over long time scales. The signal is first amplified by an amplifier 42 and then processed by an analog band-pass filter 44 with a pass-band centered at $\omega_0$ and a bandwidth of $\Delta\omega$.

A moving source of bending waves may demonstrate the Doppler effect, whereby a bending wave, which has a frequency $\omega_0$ and is emitted by a source moving at velocity v towards a point on a member, arrives at that point with a different frequency defined by $\omega_0-k(\omega_0)v$. The maximum angular frequency shift between bending waves at two different points on the member is therefore $2k(\omega_0)v_{max}$, where $v_{max}$ is the maximum velocity of the moving source. If the angular frequency shift becomes larger than the width of the band-pass filter, the phase difference equation above does not hold. Accordingly, the bandwidth $\Delta\omega$ of the filter 44 is set to be greater than this maximum frequency shift and, thus, obeys the relationship:

$$\Delta\omega>>2k(\omega_0)v_{max}.$$

After processing by the filter 44, the resulting filtered signal $W'_j(t)$ is an amplitude and phase modulated carrier with frequency $\omega_0$ and is defined by:

$$W'_j(t)=A_j(t)\sin\lfloor\omega_0 t+\theta_j(t)\rfloor,$$

where $A_j(t)$ and $\theta_j(t)$ are the amplitude and phase of the signal. Both fluctuate over a timescale $\Delta t$ determined by the bandwidth of the filter, namely $\Delta t=2\pi/\Delta\omega$. The maximum frequency at which independent phase angle measurements may be taken from the output of the bandpass filter is $1/\Delta t$. Since a touch sensor typically provides an updated measurement of the contact position every 10 ms, the condition for the minimum frequency of positional measurement is $\Delta t<10$ ms.

The filtered signal $W'_j(t)$ is then passed simultaneously to two analog phase detectors 46. Such detectors are well known in the art, for example, see p644 of "The Art of Electronics" by Horowitz and Hill. Reference signals each having frequency $\omega_0$, but a phase difference of $\pi/2$, are also fed to the two phase detectors. The outputs of the phase detectors are passed through low-pass filters 48 each having frequency cut-offs of approximately $\Delta\omega/2$. The outputs of the low-pass filters are proportional to $\cos(\theta_j)$ and $\sin(\theta_j)$ respectively. These outputs are then digitized by digitizers 50 and processed by processor 52 to give the phase angle $\theta_j$.

Figure 7B:
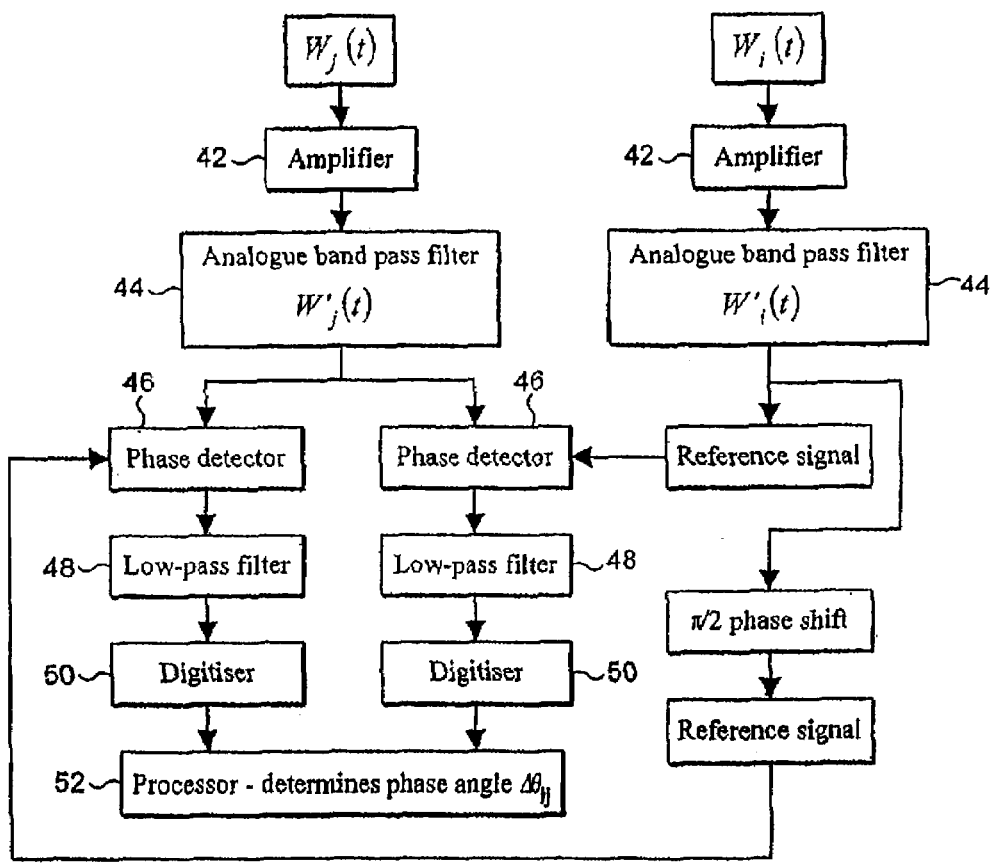

FIG. 7b shows how the reference signals used in FIG. 7a may be generated. A second bending wave signal $W_i(t)$ is measured at a second sensor. The signal is fed through an amplifier 42 and analog band-pass filter 44 to generate a filtered signal $W'_i(t)$. The filtered signal $W'_i(t)$ forms the reference signal which is fed directly to one phase detector 46. The filtered signal is also fed to the second phase detector 46 via a device which shifts its phase by $\pi/2$. The phase shifted signal is used as the reference signal to the second phase detector 46.

Figure 8A:
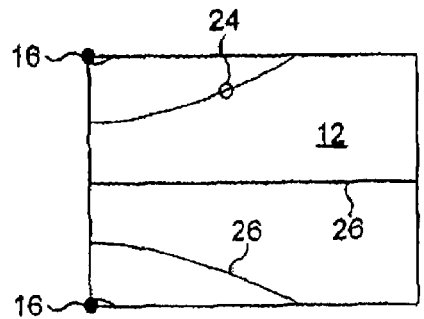
FIGS. 8a to 8d are plan views of apparatus according to an embodiment of the invention showing the hyperbolae of path-length differences.
Figure 8B:
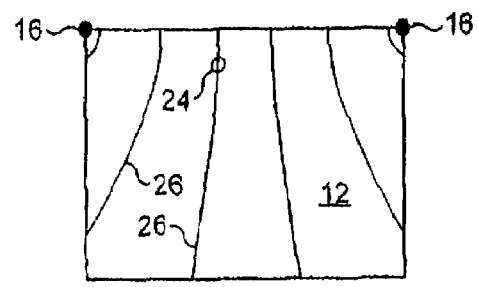
Figure 8C:
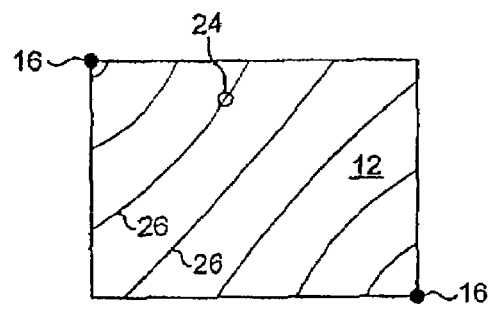
Figure 8D:
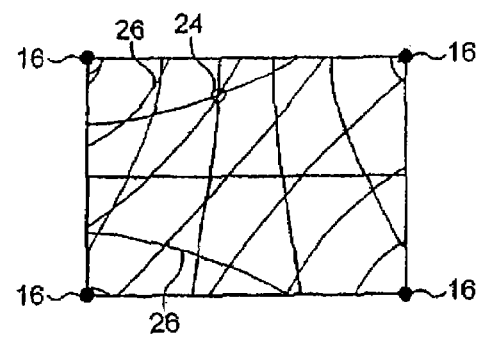

FIGS. 8a to 8d show how the phase angle differences and, hence, the path-length differences may be used to calculate the location of the contact. The equation in step (d) of FIG. 6 defines a hyperbolic curve which can be overlaid on the plate 12. FIG. 8a shows the three hyperbolic curves 26 which are generated using three different values of $n_{lm}$ and the calculated phase angle difference for a pair of sensors 16 mounted one on each end of the short sides of the plate 12. Similarly FIGS. 8b and 8c show the hyperbolic curves 26 which are generated by the phase angle difference and different values of $n_{lm}$ for two other pairs of sensors. FIG. 8d shows all the hyperbolic curves created by the sensors. The contact location 24 is the point of intersection of three hyperbolic curves, one from each pair of sensors. From the contact location 24, the correct value of $n_{lm}$ may be inferred.

Figure 9:
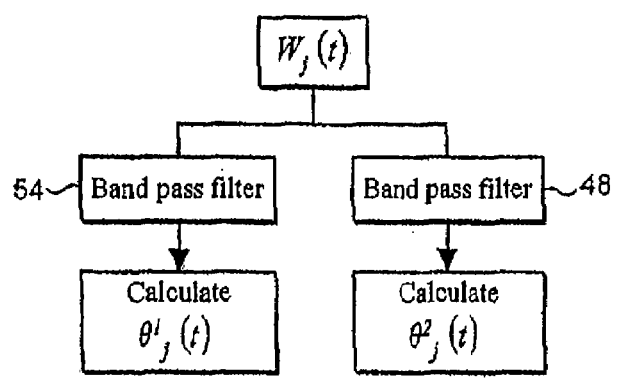
FIG. 9 is a schematic block diagram of alternative apparatus used for calculating phase angles.

A method of inferring n is implemented using the embodiment shown in FIG. 9. The bending wave signal $W_i(t)$ measured by each sensor is simultaneously processed by two band-pass filters 48,54. Two phase angles, one for each filter, are calculated, for example, as described in FIG. 7. The filters 48, 54 have slightly different pass-band frequencies whereby two phase angle differences, one for each pass-band frequency, are provided by each pair of sensors.

The phase angle differences $\Delta\theta_a$, $\Delta\theta_b$ from the sensors may be defined as $$\Delta\theta_a = k(\omega_0 + \omega_\delta)\Delta x + 2\pi n_a$$

$$\Delta\theta_b = k(\omega_0 - \omega_\delta)\Delta x + 2\pi n_b$$

where $\Delta x$ is a single path-length difference defined by the contact and the position of the sensors.

The correct combination $(n_a, n_b)$ may be determined as the combination of values that minimize the expression:

$$\left| \frac{\Delta\theta_a - 2\pi n_a}{k(\omega_0 + \omega_\delta)} - \frac{\Delta\theta_b - 2\pi n_b}{k(\omega_0 - \omega_\delta)} \right|.$$

The path-length difference may then be estimated as:

$$\Delta x = \frac{1}{2}\left( \frac{\Delta\theta_a - 2\pi n_a}{k(\omega_0 + \omega_\delta)} + \frac{\Delta\theta_b - 2\pi n_b}{k(\omega_0 - \omega_\delta)} \right).$$

Another pair of sensors may then be used to determine a second path-length difference. Each path-length difference defines a hyperbolic curve on the panel. The intersection point of these two hyperbolic curves is the location of the contact.

Note that hyperbolae are defined by values of path-length difference or $\Delta x$. In general, for a given phase-angle difference, several values of $\Delta x$ are possible (corresponding to different values of n). The advantage of using two frequencies is that a single value of $\Delta x$ can be obtained for each pair of sensors (using the method of minimizing the expression described above). The determination of the exact value of $\Delta x$, rather than a series of possible values, constrains the location of the contact to a single hyperbola, rather than a series of hyperbolae. The location can be determined exactly from the intersection of two hyperbolae and, hence, from two pairs of sensors.

Figure 10:
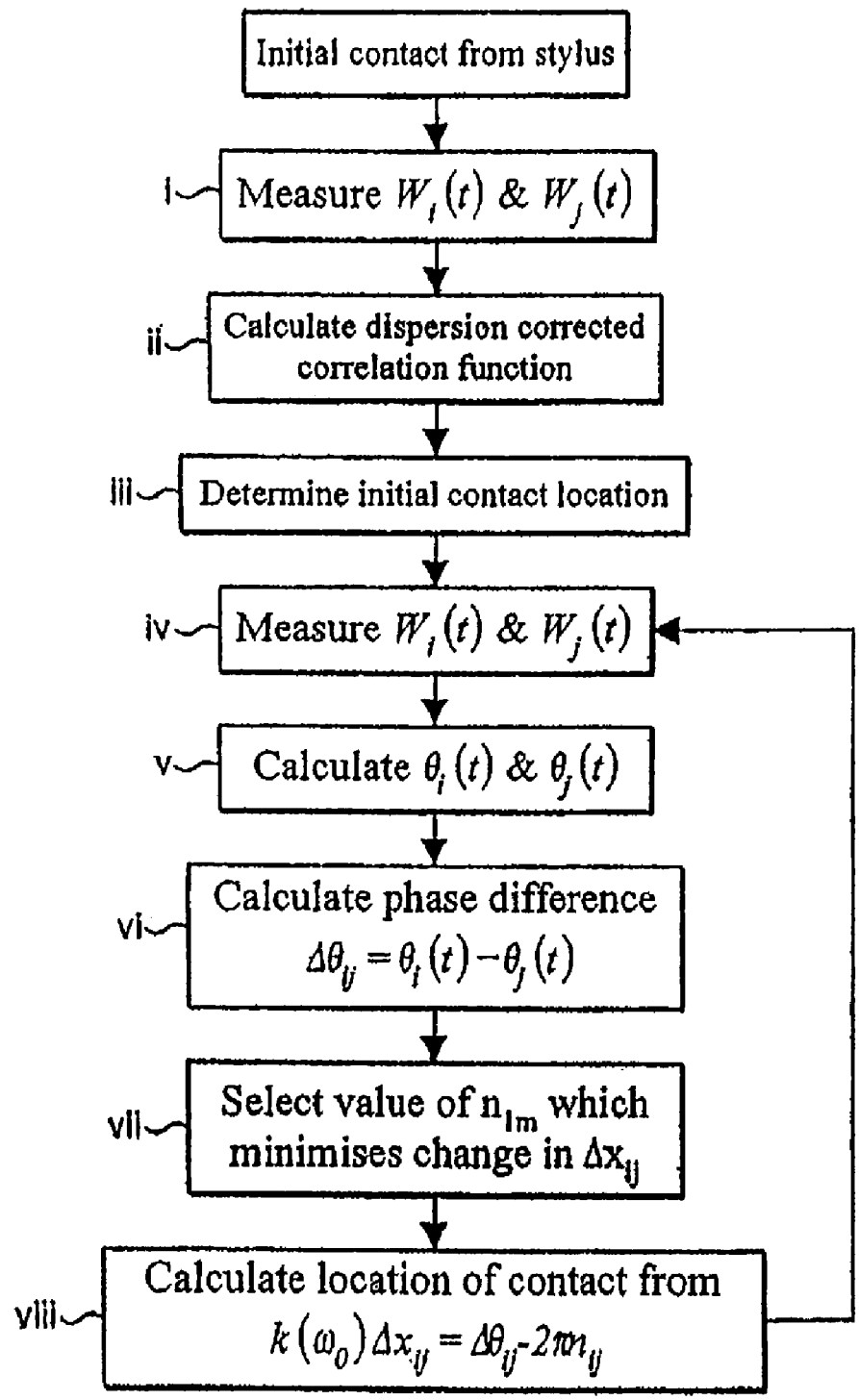
FIG. 10 is a flow chart showing an alternative method of calculating the location of the contact.

FIG. 10 shows an alternative method for calculating the location of the contact from the equation above, namely, i. Measure a pair of bending wave signals $W_i(t)$ and $W_j(t)$, one signal being measured by a sensor;
ii. Calculate the dispersion corrected correlation function of the two signals using the method described in FIGS. 11 and 11a;
iii. Calculate the initial position of the contact using the dispersion corrected correlation function, as described in FIGS. 11 and 11a;
iv. Remeasure bending wave signals $W_i(t)$ and $W_j(t)$;
v. Calculate the phase angle of each signal, for example, as described in FIGS. 7a and 7b;
vi. Calculate the difference between the phase angles;
vii. Select the value of $n_{lm}$ which minimizes the change in the path-length difference;
viii. Plot the hyperbola defined by $$k(w_0)\Delta x_{ij} = \Delta\theta_{ij} - 2\pi n_{ij};$$

ix. Repeat steps (iv) to (viii), remeasuring the bending wave signals at regular intervals $\Delta t$, for example, $\Delta t = 2\pi/\Delta\omega$.

At step (viii), a minimum of two hyperbolae from different pairs of sensors are required to determine the position of the contact. Therefore, the entire process is performed simultaneously for at least two pairs of sensors.

Figure 11:
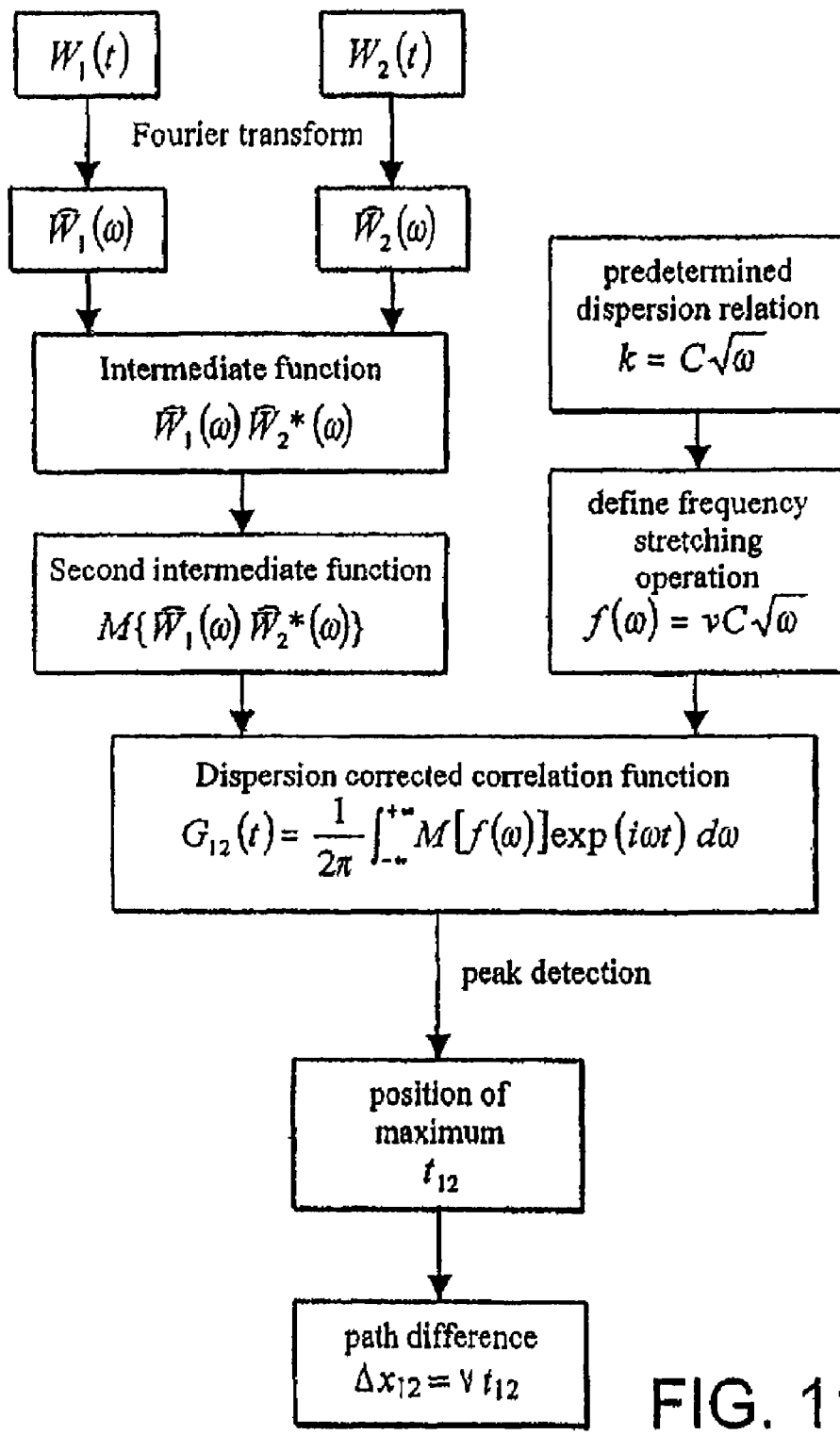
FIG. 11 is a flow chart showing a method of calculating the location of the contact using the dispersion corrected correlation function.
Figure 11A:
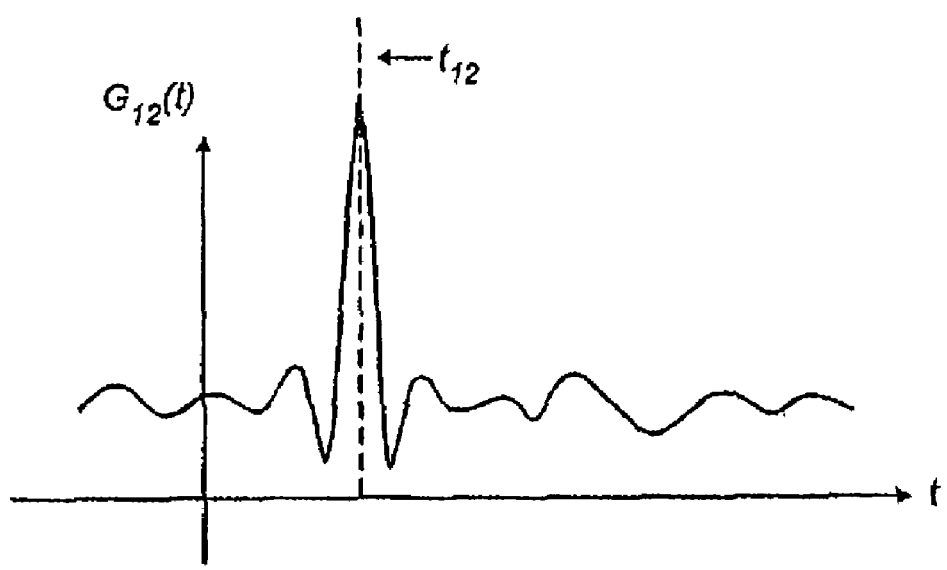
FIG. 11a is a graph of dispersion corrected correlation function against time.

FIG. 11 shows a method of calculating the dispersion corrected correlation function to reveal the difference in path-length between the contact location and the sensors. The method set out below summarizes the information in PCT/GB2002/003073. The method comprises the following steps:

(a) Measure two bending wave signals $W_1(t)$ and $W_2(t)$;
(b) Calculate the Fourier transform of $W_1(t)$ and $W_2(t)$ to arrive at $\hat{W}_1(\omega)$; and $\hat{W}_2(\omega)$ and hence the intermediate function $\hat{W}_1(\omega) \hat{W}^*_2(\omega)$; where $\hat{W}^*_2(\omega)$ is the complex conjugate Fourier transform, t represents time, $\omega$ is $2\pi f$ where f is frequency;
(c) Calculate a second intermediate function $M(\omega)$ which is a function of $\hat{W}_1(\omega)\hat{W}^*_2(\omega)$;
(d) and (e) at the same time as performing steps (a) to (c), the frequency stretching operation $f(\omega) = v(\mu/B)^{1/4}\sqrt{\omega}$ is calculated using the predetermined panel dispersion relation $k = (\mu/B)^{1/4}\sqrt{\omega}$;
(f) $M(\omega)$ and $f(\omega) = v(\mu/B)^{1/4}\sqrt{\omega}$ are combined to arrive at the dispersion corrected correlation function:

$$G(t) = \frac{1}{2\pi}\int_{-\infty}^{+\infty} M[f(\omega)]\exp(i\omega t)d\omega;$$

and (g) the dispersion corrected correlation function is plotted against time with a peak occurring at time $t_{12}$ as shown in FIG. 11a;
(h) $\Delta x_{12}$ is calculated from $t_{12}$; $\Delta x_{12}$ is the path-length difference between the path-lengths $x_1$ and $x_2$ from the first and second sensors to the contact; and
(i) $\Delta x_{12}$ defines a hyperbolae which may be plotted as in FIG. 7 to calculate the location of the contact.

As with the method of FIG. 10, a minimum of two hyperbolae are required to determine the location of the contact. Thus, the ways of generating more hyperbolae discussed above apply equally to this method.

The second intermediate function $M(\omega)$ may simply be $\hat{W}_1(\omega)\hat{W}^*_2(\omega)$ which gives a standard dispersion corrected correlation function. Alternatively, $M(\omega)$ may be selected from the following functions which all yield phase equivalent functions to the standard dispersion corrected correlation function:

(a) $M(\omega) = \dfrac{\hat{W}_1(\omega)\hat{W}^*_2(\omega)}{|\hat{W}_1(\omega)\hat{W}^*_2(\omega)|}$ (b) $M(\omega) = \dfrac{\hat{W}_1(\omega)\hat{W}_2^*(\omega)}{\sqrt{|\hat{W}_1(\omega)\hat{W}_2^*(\omega)|}}$ (c) $M(\omega)=\hat{W}_1(\omega)\hat{W}^*_2(\omega)\phi[|\hat{W}_1(\omega)\hat{W}^*_2(\omega)|]$ where $\phi(x)$ is a real valued function (d) $M(\omega)=\hat{W}_1(\omega)\hat{W}^*_2(\omega)\psi(\omega)$ where $\psi(\omega)$ is a real valued function.

Alternatively, $M(\omega)$ may be the function $\hat{D}(\omega)$ which is the Fourier transformation of the correlation function $D(t)$:

$$D(t) = \int_{-\infty}^{\infty} W_1(t+t')W_2(t')dt'.$$

The steps are calculate $D(t)$; calculate $\hat{D}(\omega)$ and apply a frequency stretching operation to arrive at the dispersion corrected correlation function:

$$G(t) = \dfrac{1}{2\pi}\int_{-\infty}^{+\infty}\hat{D}[f(\omega)]\exp(i\omega t)d\omega.$$

Alternatively, at step (f) the following dispersion corrected correlation function may be calculated:

$$G(t) = \dfrac{1}{2\pi}\int_{-\infty}^{+\infty}\hat{W}_1[f(\omega)]\hat{W}^*_2[f(\omega)]\phi_{12}[f(\omega)]\exp(i\omega t)d\omega$$

where $$\phi^*_{12}(\omega) = \left|\sum_j \hat{W}_{1,j}(\omega)\hat{W}^*_{2,j}(\omega)\exp[-ik(\omega)\Delta x_j]\right|$$

where $\{\hat{W}_{1,j}(\omega)\}$ and $\{\hat{W}^*_{2,j}(\omega)\}$ are the Fourier transformation and complex conjugate Fourier transformation of two measured bending wave signals $\{\hat{W}_{1,j}(t)\}$ and $\{\hat{W}_{2,j}(t)\}$ and $\{\Delta x_j\}$ is the path-length difference.

A sensor may act as both the first and second sensor whereby the dispersion corrected correlation function is an auto correlation function. The auto correlation function may be calculated applying the same steps for the dispersion corrected correlation function using $W_1(t)=W_2(t)$.

Figure 12A:
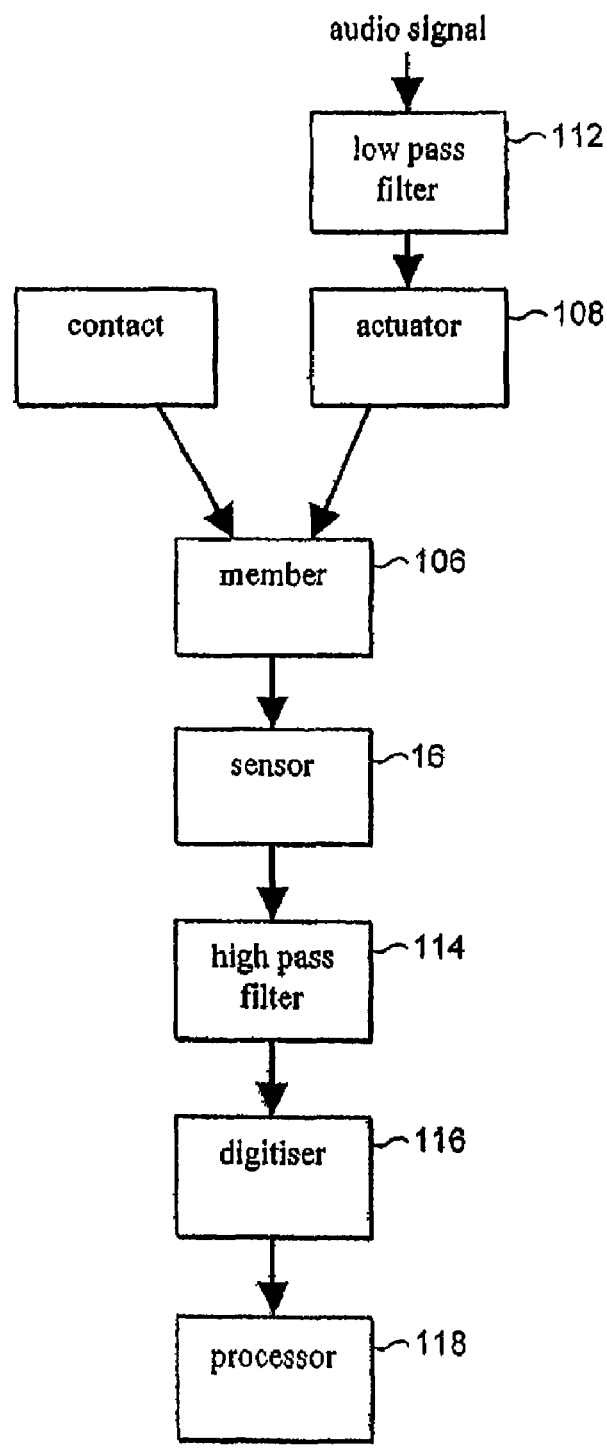
FIG. 12a is a schematic block diagram of a contact sensitive device which also operates as a loudspeaker.
Figure 12B:
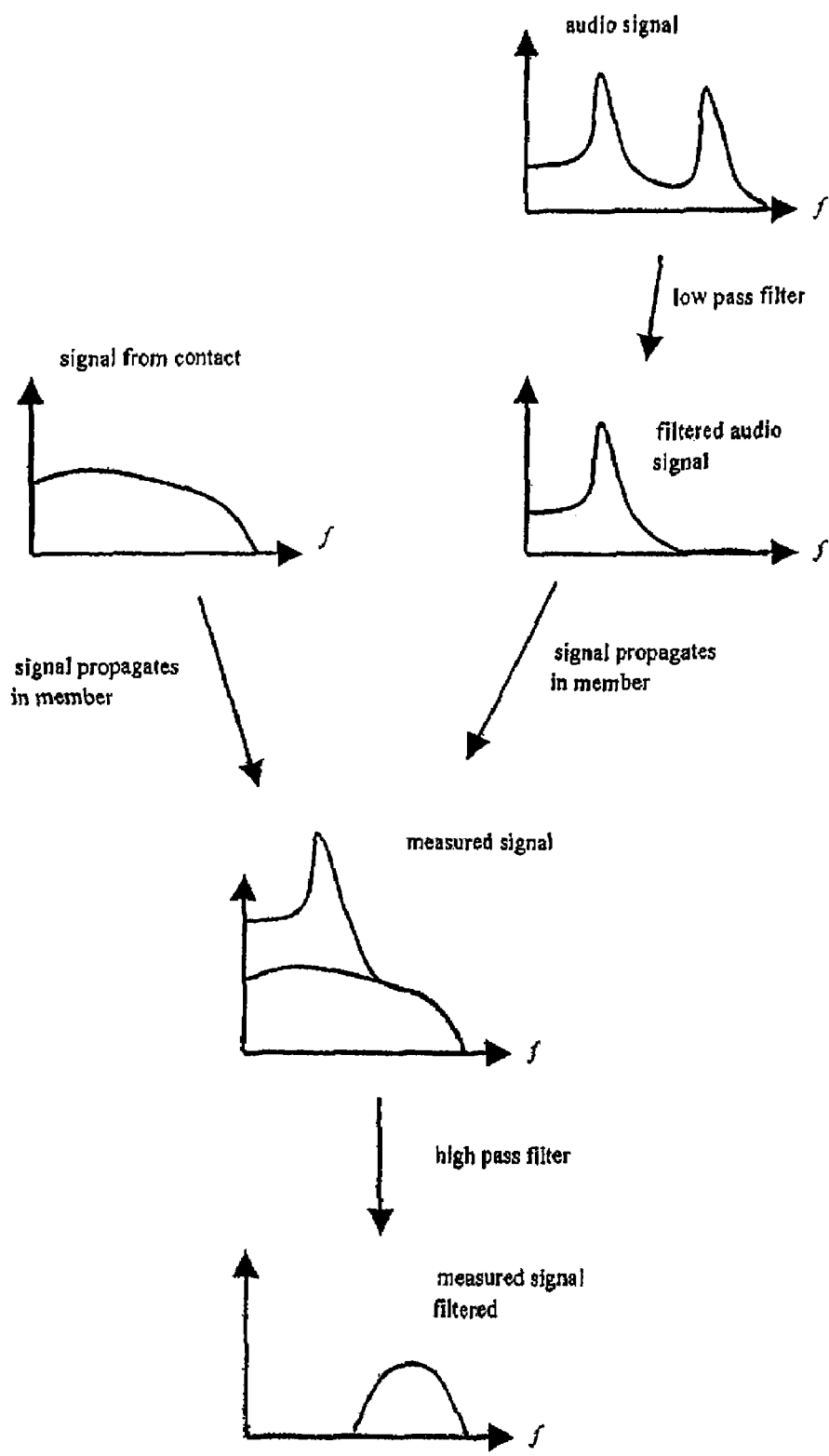

FIG. 12a shows a contact sensitive device which also operates as a loudspeaker. FIG. 12b shows a method for partitioning the audio signal and measured signal into two distinct frequency bands so that the contribution of the audio signal to the processed measured signal is suppressed. The device comprises a member 106 in which bending waves are generated by an emitting transducer or actuator 108 and the contact. The emitting transducer applies an audio signal to the member 106 to generate an acoustic output. Before being applied to the member, the audio signal is filtered by a low pass filter 112 which, as shown in FIG. 12b, removes the audio signal above a threshold frequency $f_0$.

As shown in FIG. 12b, the contact generates a signal which has a power output which is substantially constant over a large frequency band. The signal from the contact and the audio signal sum to give a combined signal which is passed through a high pass filter 114 to remove the signal below the threshold frequency $f_0$. The filtered signal is then passed to a digitizer 116 and onto a processor 118.

What is claimed is:

1. A method of determining information relating to a contact on a contact sensitive device comprising:
   providing a member capable of supporting bending waves and a plurality of sensors for measuring bending wave vibration in the member;
   measuring a bending wave signal using each of the sensors in response to a contact being applied to the member at a location;
   determining a phase angle for each measured bending wave signal;
   calculating a phase difference between the phase angles of each sensor pair of at least two pairs of sensors; and
   determining the location of the contact utilizing the at least two calculated phase differences.

2. A method according to claim 1 further comprising utilizing information about expected contact location in determining the location of the contact.

3. A method according to claim 2 where the member is a graphical user interface and presents a user with a choice of button locations to contact and the method further comprises assuming that any contact on the member occurs within the button locations in determining the location of the contact.

4. A method according to claim 2 further comprising utilizing probability of a contact occurring at a particular location in determining the location of the contact.

5. A method according to claim 4 wherein the probability of the contact occurring at the particular location is based on one or more of location, size, and frequency of use of objects presented by a graphical user interface.

6. A method according to claim 1 wherein the phase difference between the phase angles of each pair of sensors is given by $\Delta\theta_{lm}=\theta_l-\theta_m=k(\omega_0)\Delta x_{lm}+2\pi n_{lm}$ where $\theta_l$ and $\theta_m$ are the phase angles of respective measured bending wave signals $\Delta x_{lm=xl}-x_m$ is a path-length difference of two sensors, $x_l$ and $x_m$ being respective distances from the contact location to each sensor, $k\omega_0$ is a wavevector and $n_{lm}$ is an integer, and the method further comprises using a state-space estimator to evaluate the likelihood of successive sequences of $n_{lm}$, and selecting one of the sequences having a maximum measure of likelihood.

7. A method according to claim 6 further comprising the state-space estimator utilizing a sequence of a pair of path-length differences taken at different times to estimate position and velocity of the contact at the different times.

8. A method according to claim 7 further comprising choosing a correct sequence of integers, $n_{lm}$, for which the state-space estimator gives a maximum measure of likelihood.

9. A method according to claim 7 wherein the state-space estimator uses a random walk as a statistical description of motion of the contact.

10. A method according to claim 1 wherein determining the location of the contact is performed in a processor.

11. A method for determining a location of a contact on a member capable of supporting bending waves, the member having a plurality of sensors for measuring bending wave vibration in the member, the method comprising:
    measuring bending wave signals at respective sensors in response to the contact being applied to the member at the location;
    determining the location of the contact using at least one path-length difference for each sensor pair of at least two sensor pairs, the at least one path-length difference of each sensor pair being determined according to a phase angle difference of the bending wave signals measured by respective sensors of the sensor pair.

12. A method according to claim 11 wherein a single value of the path-length difference is determined for each sensor pair and an intersection of two hyperbolae defined by the at least two path-length differences defines the location of the contact.

13. A method according to claim 12 further comprising processing the bending wave signal measured by each sensor using separate band-pass filters, calculating two phase angles for the bending wave signal measured by each sensor, respective phase angles corresponding to each band-bass filter, and providing two phase angle differences for each sensor pair, the two phase angle differences for each sensor pair being used to calculate the single value of the path-length difference for each sensor pair.

14. A method according to claim 11 wherein determining the location of the contact is performed in a processor.

* * * * *